(12) United States Patent
McNeil

(10) Patent No.: US 6,591,873 B1
(45) Date of Patent: Jul. 15, 2003

(54) TURBO FAN ASPIRATOR

(75) Inventor: Daniel A. McNeil, Metuchen, NJ (US)

(73) Assignee: Air Cruisers Company, Wall, NJ (US)

( * ) Notice: Subject to any disclaimer, the term of this patent is extended or adjusted under 35 U.S.C. 154(b) by 48 days.

(21) Appl. No.: 09/989,010

(22) Filed: Nov. 21, 2001

(51) Int. Cl.$^7$ ............................................. B65B 31/00
(52) U.S. Cl. ................. 141/4; 141/9; 141/38; 141/105; 417/352; 417/408; 416/198 R
(58) Field of Search .................... 141/1, 4, 9, 38, 141/100, 105; 417/247, 352, 405, 406, 408; 416/198 R, 199, 175; 415/202; 441/41

(56) References Cited

U.S. PATENT DOCUMENTS

| | | | |
|---|---|---|---|
| 2,428,330 A | * 9/1947 | Heppner | ...................... 417/247 |
| 2,906,447 A | * 9/1959 | Seed | ........................... 417/352 |
| 3,083,893 A | * 4/1963 | Dean | ........................... 417/247 |
| RE27,860 E | 1/1974 | Day | |
| 3,840,057 A | 10/1974 | Lesh, Jr. | |
| 4,008,983 A | 2/1977 | Flatt et al. | |
| 4,671,744 A | 6/1987 | Shaffer et al. | |
| 5,738,305 A | 4/1998 | Pruitt | |
| 6,004,176 A | 12/1999 | Moran | |

* cited by examiner

Primary Examiner—Gregory Huson
Assistant Examiner—Peter deVore
(74) Attorney, Agent, or Firm—Lawrence G. Fridman

(57) ABSTRACT

An aspirator assembly for enabling rapid inflation of evacuation slides and life rafts is configured for direct attachment to the inflatable article. The aspirator assembly comprises an open-ended body housing, a nozzle arrangement for introducing a pressurized fluid into the aspirator and toward a pair of counter-rotating impeller arrangements. The counter-rotating impeller arrangements allow for minimizing the internal forces to enable the stable mounting of the aspirator to the inflatable article without causing damage to the article material during operation.

20 Claims, 5 Drawing Sheets

TURBO FAN ASPIRATOR

BACKGROUND OF THE INVENTION

1. Field of the Invention

The present invention relates to devices used for rapid inflation and deployment of inflatable structures such as evacuation slides, rafts and the like, and more particularly it relates to aspirators utilized for this purpose.

2. Description of the Prior Art

Rapid inflation systems are currently used in various applications, but have achieved significant commercial recognition in the aviation industry in connection with the rapid inflation of evacuation slides and life rafts deployed during emergency situations. Typical rapid inflation systems incorporate an aspirator functioning in accordance with the Venturi principle. Specifically, such aspirators utilize pressurized primary gas to induce, or aspirate, a secondary gas or ambient air to combine with the pressurized gas to effect rapid inflation of the inflatable structure. The pressurized primary gas is rapidly introduced into the aspirator assembly through a nozzle arrangement. The rapid introduction of pressurized primary gas creates a partial vacuum within the aspirator assembly, thereby entraining the secondary gas or ambient air to enter the aspirator assembly. Once inside the aspirator assembly, the ambient air generates a combined air-gas flow mixture. This combined air-gas flow exits the aspirator through a discharge region of the aspirator capable of being disposed within an inflatable structure. Thus, the aspirator assembly uses a relatively small volume of pressurized primary gas to entrain a relatively large volume of a secondary gas or ambient air to inflate an inflatable structure. The efficiency of the aspirator assembly is often measured by its "mass-flow ratio", or "augmentation ratio," which is a ratio of the volume of primary gas used by the aspirator assembly to the volume of secondary gas or ambient air entrained by the aspirator assembly.

In the prior art, turbo or fan-type impeller driven aspirators used for inflating relatively large inflatable articles, such as airplane escape slides and rafts, are typically provided hard mounted to a fixed structure physically independent of the inflatable article. Generally, permanent attachment to the greater mass is required to compensate for external movement or gyration of the aspirator resulting from internal forces generated during operation of the aspirator. For example, external mounting is necessary to support the rotation of an unbalanced single impeller, such as a fan, and to withstand corresponding reactive inertial forces. For instance, aspirators for aircraft escape slides are generally provided within the body of the aircraft secured to a fuselage wall or other aircraft framework. It is necessary to bolt or otherwise permanently secure the aspirator to a frame or other external structure having mass substantially greater than the mass of the aspirator itself. The movement or gyration of an aspirator directly attached to an inflatable article introduces an often substantial risk of damage to the aspirator and/or inflatable article.

It is well recognized in the art that it should be advantageous to be able to attach an aspirator directly to an inflatable article. In the case of an aircraft, there are numerous internal systems that can negatively affect operation of an internally mounted aspirator and, thus, reliability of the evacuation procedure. Consequently, the ability to reposition an aspirator from the interior of an aircraft to the evacuation slide or life raft itself would make the entire evacuation system more independent and reliable. Furthermore, directly attaching the aspirator to the inflatable article would enable greater utilization of surrounding environmental atmospheric air, thereby enhancing inflation speed and efficiency.

Accordingly, there is an established need for an aspirator overcoming the aforementioned drawbacks and limitations of the prior art. In particular, it would be desirable to provide an aspirator assembly capable of being directly mounted to an inflatable structure, such as an escape slide or life raft, while maintaining stability of the aspirator with respect to the inflatable structure and, thereby, avoiding damage to the inflatable structure from external forces generated during operation of the aspirator. Furthermore, it would be desirable to provide such an aspirator having an improved mass-flow ratio, while maintaining a ace, simplified design lending itself to cost-effective manufacture.

SUMMARY OF THE INVENTION

The invention is directed to an aspirator assembly particularly adapted for the rapid inflation of relatively large inflatable structures such as emergency escape slides and life rafts found on aircraft.

One aspect of the present invention provides an aspirator assembly capable of providing faster and more efficient inflation of inflatable articles.

A further aspect of the present, invention provides an aspirator assembly having internal components designed and configured in a manner encouraging neutralization of generated internal forces during operation.

Still a further aspect of the present invention provides an aspirator assembly having a force balancing construction wherein gyrations and other external aspirator body forces are substantially neutralized during operation to enable direct attachment of the aspirator to an inflatable article without imparting undue loads thereto, thereby preventing ripping/tearing of the article material and entanglement between the aspirator and article material.

Yet a further aspect of the present invention provides an aspirator assembly having a relatively lightweight, simple, and low cost construction.

The invention provides an aspirator assembly adapted for direct attachment to inflatable articles, including: a generally cylindrical open-ended body having opposite upstream and downstream ends; a main conduit member disposed within and attached to the housing and disposed transverse to the longitudinal central axis thereof, the main conduit having an inlet for introducing a first pressurized gas therein and at least a pair of exit nozzles for directing a balanced flow of pressurized gas downstream therefrom; a central shaft extending downstream from the main conduit along the central axis of the aspirator body; and at least one pair of adjacent counter-rotating impeller members rotationally mounted on the central shaft, wherein the impellers include central vane portions and outer blade portions having mirror image surface geometries.

During operation of the aspirator, the first pressurized gas is directed through the exit nozzles to impinge upon the central internal vanes of a primary impeller in a radial symmetric fashion, causing substantially planar rotation of the primary impeller. This creates a pressure gradient for entraining a secondary gas or ambient air into the main body and directed downstream toward the secondary impeller. Internal flow swirl velocities generated by primary impeller rotation effect corresponding counter-rotation of the secondary impeller. The counter-rotating secondary impeller recovers the kinetic energy from the induced swirl velocities and counteracts the generated inertial forces to substantially neutralize internal forces within the aspirator body.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. The invention will now be described with additional specificity and detail through the accompanying drawings.

DETAILED DESCRIPTION OF THE PREFERRED EMBODIMENTS

Shown throughout the figures, the present invention is generally directed to a turbo aspirator for rapid inflation of large inflatable articles, such as aircraft emergency slides and life rafts, wherein the aspirator has an improved structure for minimizing internal forces generated during operation and thereby enabling the aspirator to be stably mounted directly to the inflatable article.

Figure 1:
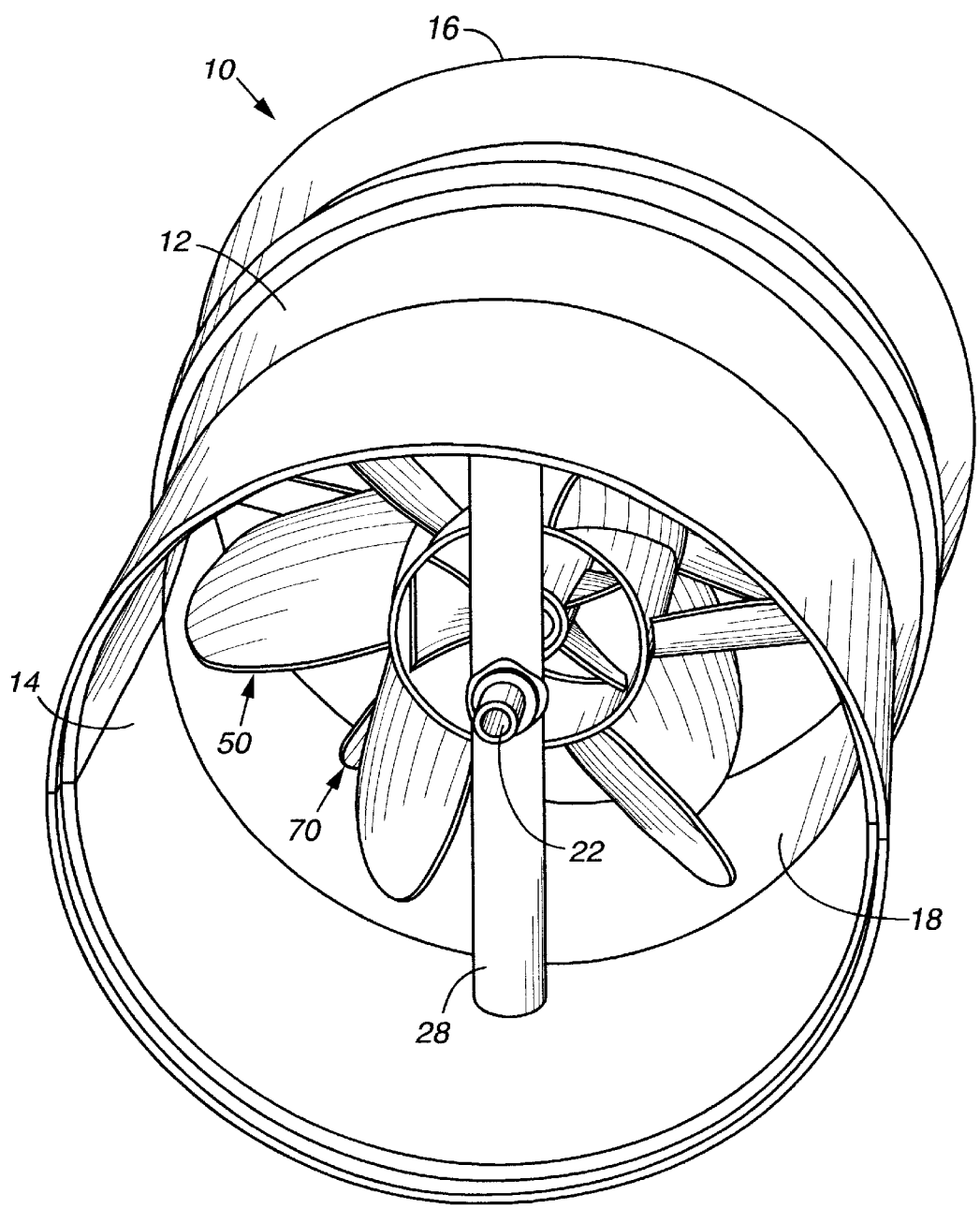
FIG. 1 is a perspective view of the aspirator assembly of the present invention, viewed from the upstream end of aspirator housing.
Figure 2:
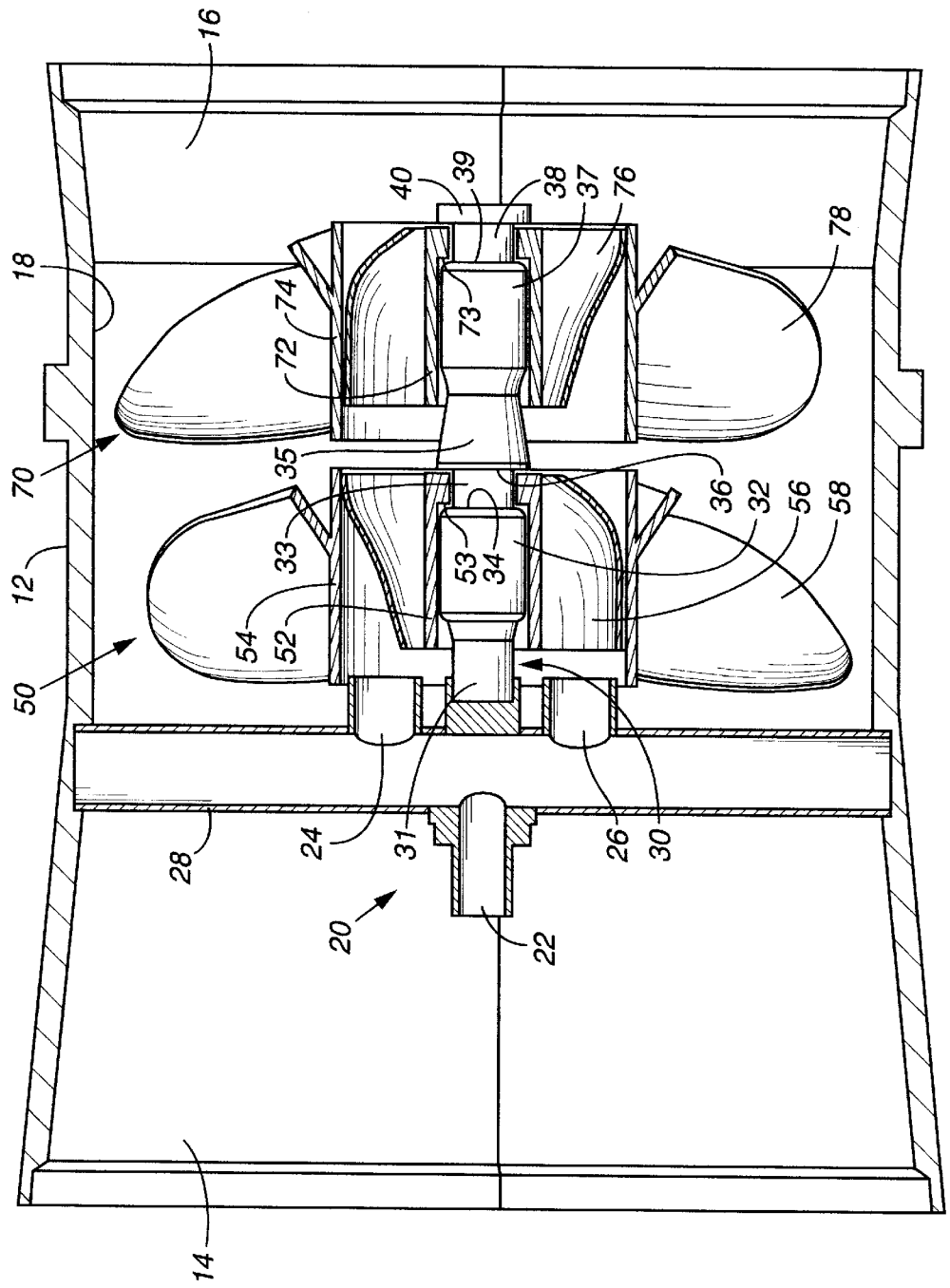
FIG. 2 is a longitudinal full-sectional view of the aspirator assembly of the present invention with one pair of impeller units.
Figure 4:
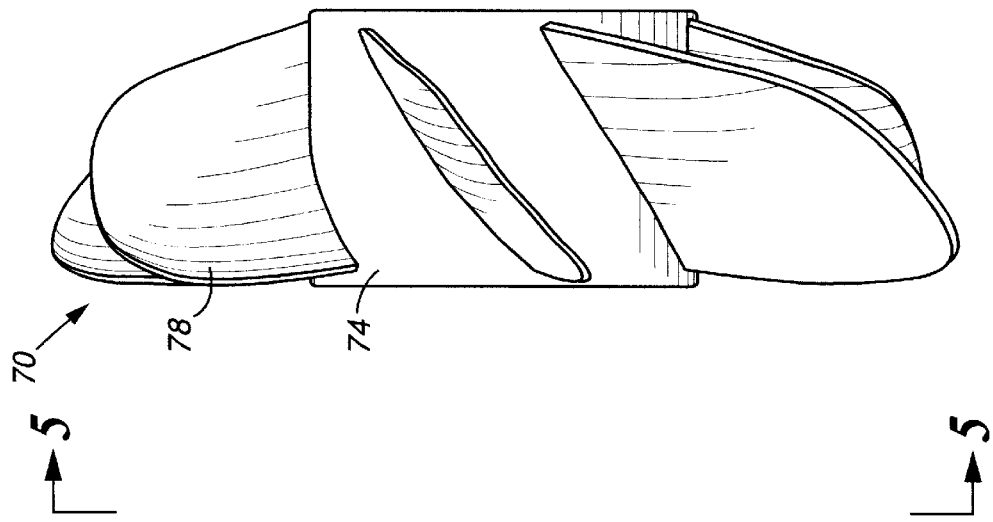
FIGS. 3 and 4 are respective side views of the primary and secondary fan members, in their assembled orientation, with the left side being upstream and the right side downstream.
Figure 3:
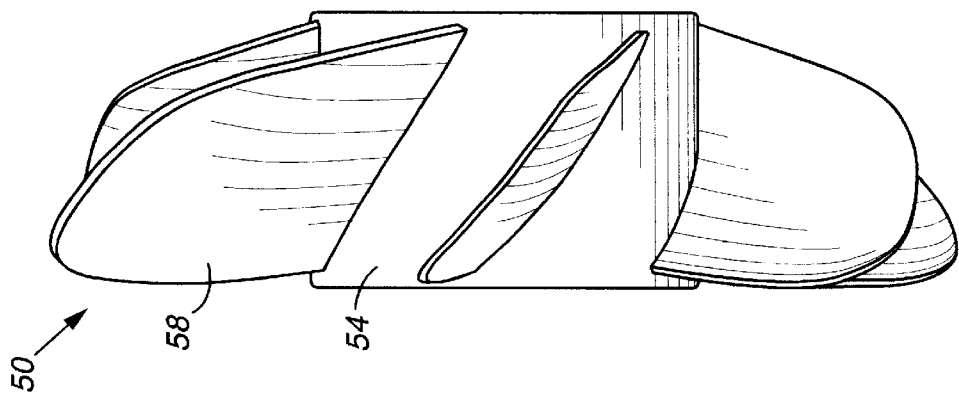

Referring now primarily to FIGS. 1 and 2, the aspirator assembly of the present invention, shown generally by reference numeral 10, is primarily contained within an open-ended main substantially cylindrical body 12, or housing, having flared opposing upstream and downstream ends, 14 and 16, respectively. The main components of the aspirator assembly include: a duct work, or duct arrangement, shown generally as reference numeral 20; a main central shaft 30; a primary fan-type impeller member 50; and a secondary fan-type impeller member 70.

The duct work 20 includes a main center tube 28 fixedly attached to the inner surface 18 of body 12. Inlets 21 and 22 are provided for introducing a pressurized primary gas into the main center tube 28 from a pressurized gas reservoir or other pressure source (not shown). Two or more exit nozzles 24, 26 extend transversely from tube 28 for directing the introduced pressurized primary gas downstream. In the embodiment of FIG. 2, inlet 22 can be substantially axially aligned with the longitudinal axis, or central axis, of cylindrical body 12. Nevertheless, as will be apparent to those skilled in the art, one or more inlets can be provided at alternative positions along main center tube 28 without departing from the scope of the invention. Similarly, although only two exit nozzles are illustrated in the accompanying drawings, more than two exit nozzles are possible. For reasons further described below, it is important that the exit nozzles are provided in a radial symmetric relation about the common central axis of main shaft 30 and aspirator body 12.

The main shaft, shown generally as reference numeral 30, is provided for rotatably supporting primary and secondary impeller members, 50 and 70, respectively. Preferably, fan-type impellers are used with the present invention. However, it will be apparent to those skilled in the art that the term "impeller" broadly defines any rotating member of a turbine, blower, fan and the like, and alternate impeller arrangement can be employed with the present invention. Accordingly, specific references herein to a "fan", "fan member", "fan unit" or similar designation, are not intended to be limiting. Preferably, the main shaft 30 is comprised of individual mating shaft segments each supporting a single fan unit. Specifically, the first shaft segment 32 supporting primary fan unit 50 extends from leftmost shaft portion 31 to rightmost shaft portion 33; and the second shaft segment 37 supporting secondary fan unit 70 extends from leftmost shaft portion 35 to rightmost shaft portion 38.

Figure 6:
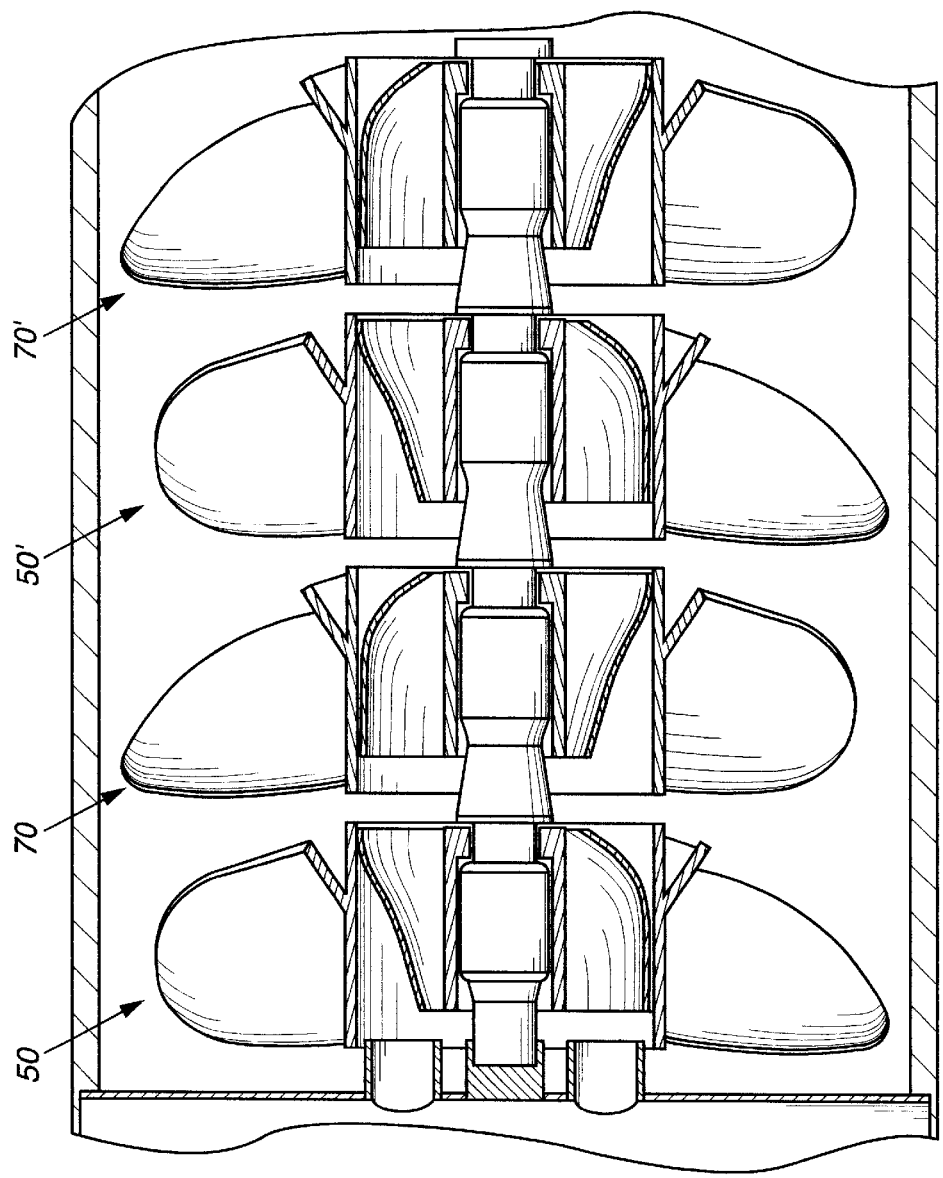
FIG. 6 is a partial-sectional view of the aspirator assembly with multiple pairs of impeller units.

Although the aspirator apparatus of the present invention is described as having a single pair of impeller units, it should be understood that a system having multiple pairs of impeller units or fans is within the scope of the invention. As will be apparent to those skilled in the art, such multiple pairs of impeller units should generate a greater pressure differential between the aspirator body upstream end 14 and downstream end 16, thereby creating greater efficiency of the suction resulting therefrom. In this respect, FIG. 6 illustrates the aspirator with two pairs of impeller units 50, 70 and 50', 70'.

Returning back to FIG. 2, primary fan unit 50 includes a plurality of evenly spaced inner vanes 56 interposed between inner cylindrical hub wall 52 and outer cylindrical hub wall 54; and a plurality of symmetrically designed and balanced outer blades 58 extending from the outer surface of outer hub wall 54. In like fashion, secondary fan unit 70 includes a plurality of evenly spaced inner vanes 76 interposed between inner cylindrical hub wall 72 and outer cylindrical hub wall 74, and a plurality of symmetrically designed and balanced outer blades 78 extending from the outer surface of outer hub wall 74. The symmetric design and balance of the outer blades 58, 78 minimize the creation of any inertial imbalance during rotation. For example, such imbalance might occur if an odd number of impeller blades or non-symmetric positioning of impeller blades are provided.

Inner substantially cylindrical hub wall 52 of fan unit 50 is rotationally mounted upon thickened shaft portion 32 such that the fan unit 50 is freely rotatable about shaft portion 32 with minimal friction. Furthermore, inner substantially cylindrical hub portion 52 includes a reduced diameter end portion 53 captivated between end 34 of shaft segment 32 and end 36 of shaft segment 35. In this manner, axial travel of fan 50 is substantially restricted. Likewise, inner cylindrical hub portion 72 of fan unit 70 is rotationally mounted upon thickened shaft portion 37, enabling free rotation of fan unit 70 thereabout. Inner cylindrical hub portion 72 includes a reduced diameter end portion 73 captivated between end 39 of shaft portion 37 and stop member 40, thereby substantially restricting axial movement of fan unit 70. Additionally, fan units 50 and 70 rotate about main shaft 30 independently of one another.

The particular design and construction of the fan units 50, 70, as well as the orientation of the fan units with respect to each other in the assembled aspirator unit 10, are important aspects of the present invention. In fact, the construction and orientation of the fan units are primarily responsible for enabling the improved stability of the aspirator during operation.

A significant aspect of the individual fan unit design is the relationship of the surface contour, or curvature, of the inner vanes vis-à-vis that of the outer blades. This relationship of the corresponding inner vane and outer blade designs is best illustrated with particular reference to FIG. 5.

Figure 5:
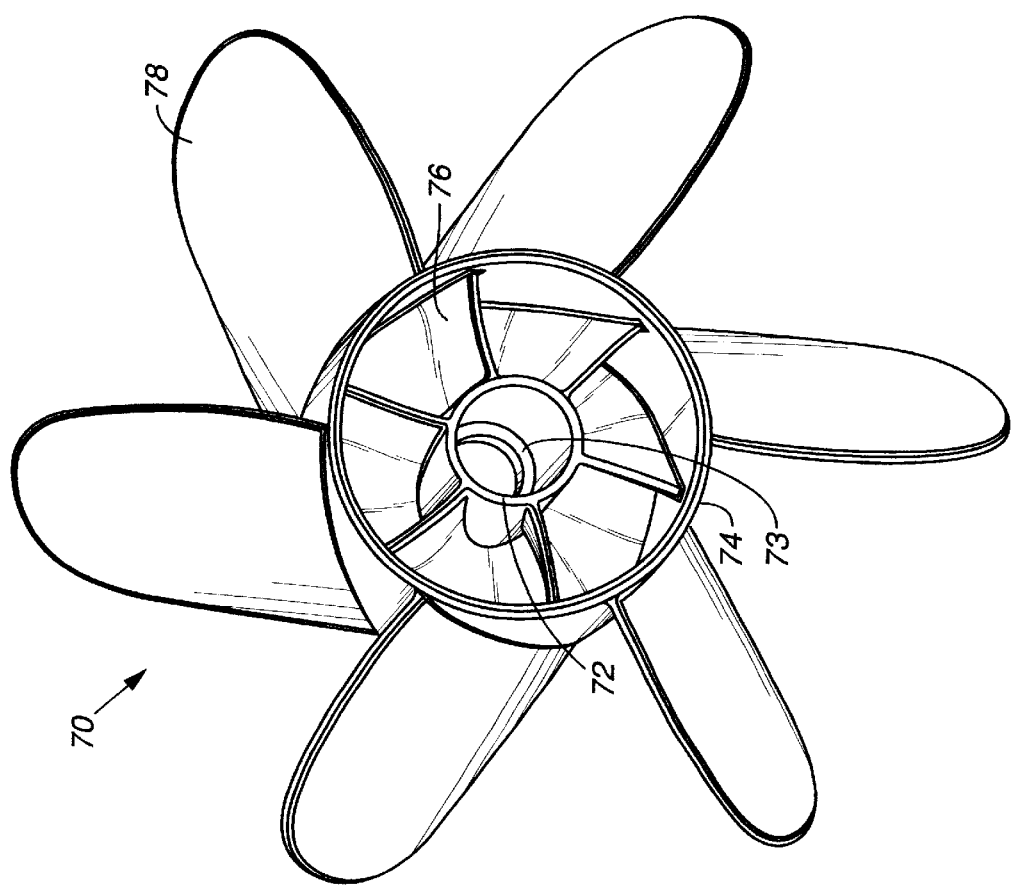
FIG. 5 is a perspective view of secondary fan member, viewed from upstream, illustrating the preferred internal fan vane and external fan blade surface geometries.

In FIG. 5, secondary fan unit 70 is viewed from the front, or upstream, side. In this orientation, the inner vanes 76 have a concave front surface contour which acts to capture the energy of a fluid stream impinging thereon. Furthermore, the vanes extend in a rearward direction at an angle such that the impinging flow causes rotation, and in this case clockwise rotation, of the fan unit 70 about the central shaft 30. The outer fan blades 78 have a convex front surface contour, and they extend in a rearward direction at a similar angular orientation to the corresponding vanes 76. Consequently, during clockwise rotation of the fan unit 70, the outer fan blades 78 tend to cause a corresponding downstream-directed clockwise fluid swirl.

As stated above, another significant aspect of the present invention is the orientation of the individual fan units of each fan pair to one another, and particularly the orientation of the cooperating inner vanes and outer blades of each fan unit comprising a pair. Specifically, the individual fan units must cooperate to cause counter-rotation with respect to each other. In the present invention, optimal counter-rotation is achieved using cooperating fan units having mirror-image inner vane and outer blade surface contours. As used herein, the term "mirror-image" is intended to generally describe the relationship of the surface contours and orientations of the corresponding vane portions 56, 76 and blade portions 58, 78 of the fan units 50, 76 with the aspirator assembly in a fully constructed operational state.

Accordingly, primary fan unit 50, viewed from the front, or upstream side, includes inner vanes 56 having a concave surface contour and extending in a rearward direction at an angular orientation diametrically opposing that or secondary fan inner vanes 76. Consequently, an impinging fluid stream causes rotation, and in this case counter-clockwise rotation, of the fan unit 50 about the central shaft 30 opposite that of secondary fan unit 70. Similarly, the outer fan blades 58 have a convex front surface contour and extend in a rearward direction at an angular orientation diametrically opposing that of secondary fan outer blades 78. Consequently, during counter-clockwise rotation of the fan unit 50, the outer fan blades 58 tend to cause a corresponding downstream-directed counter-clockwise fluid swirl opposing the clockwise fluid swirl effected by rotating secondary fan unit 70.

As will be apparent to those skilled in the art, the particular orientations of the inner vane portions 56, 76 and outer blade portions 58, 78 in the accompanying drawing figures are merely exemplary. That is, the particular order of the primary and secondary fan units 50, 70 along the central supporting shaft 30 could be reversed without effecting overall operation of the aspirator assembly.

The fan units 50, 70 can be constructed from a lightweight polymer resin in order to further minimize tangential centrifugal accelerations which could deleteriously affect the stability of the assembly.

Referring now to FIGS. 1–5, the operation of the aspirator assembly 10 will be described in more detail. The initial energy for the system is derived from a conventional source of a pressurized fluid which can be a reservoir, a compressor arrangement, etc. This source is not considered part of the invention. It is well known in the art and further description is not provided. The primary pressurized fluid is introduced into the aspirator assembly 10 through center tube 28. The pressurized fluid escapes the high-pressure duct arrangement 20 via a balanced set of exit nozzles 24, 26. As used herein, the term "balanced" refers to the radial symmetry of the positioning of the exit nozzles about the central axis of main shaft 30. The significance of the balancing of the exit nozzles 24, 26 is to enact a uniform pressure distribution upon the main central vanes 56 of the primary fan unit 50 in order to minimize or prevent any dynamic imbalance in the fan unit 50 during rotation. In other words, the main internal vanes 56 are symmetrically loaded in order to maintain a single uniform plane of rotation which is substantially perpendicular to the shared central axis of main shaft 30 and aspirator body 12.

The primary pressurized gas is thrusted into the central vanes 56 of the primary impeller 50 to cause rotation of outer fan blades 58. The surface geometry of the central vanes 56 is particularly designed to capture the thrusting pressure from the exit nozzles 24, 26 and to provide a medium for releasing the resulting energy while causing minimal airflow disturbance and avoiding the creation of any turbulence flow. The outer fan blades 58 are utilized to capture, or entrain, ambient air, i.e., taking air from upstream of the primary fan unit 50 and forcing it downstream toward the end 16 and the secondary fan unit 70. Specifically, the outer blades 58 of primary fan 50 rotate in a manner such that a partial vacuum is created upstream of fan unit 50, entraining ambient air into the aspirator body 12 through upstream end 14. Correspondingly, the region of the aspirator body 12 downstream of fan unit 50 is pressurized. This secondary downstream pressure induces rotation of the secondary fan unit 70. Thus, the operation of the secondary fan unit 70 is a function of, or subordinate to, the operation of the primary fan unit 50.

After the working fluid and ambient drawn fluid have traversed the primary fan 50, the generated pressurized ambient air and slightly degraded pressurized working fluid continue to expand into the secondary fan unit 70. Furthermore, as a byproduct of the applied angular energy of the rotating primary fan unit 50, an aerodynamic vortex is induced in the drawn ambient fluid and vectored downstream of the primary fan blades 58 in conjunction with the primary working fluid.

The arrow of vortex acts on any surface or any wall that it comes into contact with. The kinetic energy generated by these forces will act on the walls and the shaft of the aspirator. Thus, as: the fan spins clockwise, the nature of these forces is to counteract the rotational force and move the aspirator body 12 counterclockwise. Similarly, as the air is given kinetic energy through the swirl or through a vortex, as it comes into contact with the walls 18 of the aspirator body 12, or the walls of the inflatable structure, the tendency for those walls is to counteract the swirl through motion in the opposite direction.

The primary function of the secondary fan vanes 76 and blades 78 is to capture any of the high-pressure air not utilized by the primary fan vanes 56, with the objective of minimizing, and preferably nullifying, any unwanted energy generated by the primary fan unit 50. As previously mentioned, the surface geometry of the vanes 76 and blades 78 of the secondary fan unit 70 mirror-image the corresponding surface geometry of the vanes 56 and blades 58 of the primary fan unit 50, effecting rotation of the secondary fan unit in the direction counter to that of the primary fan unit. This counter-rotational relationship is an important aspect of the present invention, in that it minimizes or nullifies internal aspirator forces generated during operation.

Specifically, the inertial load caused by the rotating mass of the primary fan unit 50 is substantially neutralized by the corresponding rotating mass of the secondary fan unit 70, while the angular velocity of the vortex generated by the primary fan unit 50 is counteracted by a mirror image angular velocity of flow generated by the counter-rotating fan blades 78 of the secondary fan unit 70. The counter-rotating outer blades 78 of the secondary fan unit 70 induce an airflow having an angle of velocity that is the mirror image of the primary fan unit generated vortex. Thus, the induced angular momentum or arrow of vortex is substantially neutralized.

The arrangement of the present invention results in improved stability and reduced movement of the entire aspirator assembly 10. This is especially advantageous since the aspirator of the invention does not require fixed mounting to the structural elements of the aircraft. Consequently, the aspirator assembly of the invention can be conveniently separated from the aircraft and positioned within the inflatable evacuation slide or life raft.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the, appended claims and their legal equivalence.

What is claimed is:

1. An aspirator assembly adapted for attachment to an inflatable article, comprising:

an open-ended housing having opposite upstream and downstream ends;

a source of a first pressurized fluid and at least two exit nozzles for directing said first pressurized fluid downstream therefrom;

a central shaft extending longitudinally within the housing, said shaft being disposed along the longitudinal axis of said housing;

at least a pair of primary and secondary impeller arrangements, said primary impeller arrangement rotationally mounted upon said central shaft and having integral central inner vane portions and outer blade portions; and, said secondary impeller arrangement rotationally mounted upon said central shaft adjacent to and downstream from said primary impeller arrangement, said secondary impeller arrangement having central inner vane portions and outer blade portions, wherein during operation, said first pressurized fluid is introduced into said housing and directed through said at least two exit nozzles toward the central internal vane portions of said primary impeller arrangement to effect rotation thereof in the first direction, the rotating outer blade portions of said primary impeller arrangement effecting entrainment of a secondary fluid into said housing through the open upstream end thereof, the rotation of said primary impeller arrangement causing corresponding counter-rotation of said secondary impeller arrangement in the second direction which is counter to the first direction.

2. An aspirator assembly as recited in claim 1, wherein said source of first pressurized fluid is connected to said housing by means of a main conduit having an inlet, the inlet of said main conduit member is longitudinally aligned with the central axis of said aspirator housing.

3. An aspirator assembly as recited in claim 1, wherein said at least two exit nozzles are positioned in a manner encouraging the pressurized fluid exiting therefrom to impinge upon the central vane portions of said primary impeller arrangement in such manner that the corresponding inertial loads imparted upon said vane portions are substantially symmetric, thereby minimizing dynamic imbalance of the primary impeller arrangement during rotation.

4. An aspirator assembly as recited in claim 3, wherein a main conduit member is disposed transversely to a longitudinal axis of the housing and formed with an inlet for introducing said first pressurized fluid therein, said central shaft being positioned substantially perpendicular to said main conduit member, and at least two exit nozzles are positioned in radial symmetric relation about the central axis of said housing.

5. An aspirator assembly as recited in claim 1, wherein said central shaft further comprises a plurality of independent non-rotating shaft segments each positioned in abutting engagement with an adjacent one of said shaft segments.

6. An aspirator assembly as recited in claim 1, wherein said primary and secondary impeller arrangements are each rotationally mounted upon a thickened portion of one of said shaft segments.

7. An aspirator assembly as recited in claim 1, wherein said primary and secondary impeller arrangements rotate freely about said central shaft independently of each other.

8. An aspirator assembly as recited in claim 1, wherein said primary and secondary impeller arrangements engage said central shaft in a manner inhibiting sliding movement thereof along said central shaft.

9. An aspirator assembly as recited in claim 1, wherein said primary and secondary impeller arrangements are constructed and configured such that rotation of said primary impeller arrangement induces corresponding counter-rotation of said secondary impeller arrangement.

10. An aspirator assembly as recited in claim 9, wherein said primary and secondary impeller arrangements are constructed and configured such that inertial forces generated by the rotation of said primary impeller arrangement are substantially neutralized by the corresponding counter-rotation of said secondary impeller arrangement.

11. An aspirator assembly as recited in claim 9, wherein said primary and secondary impeller arrangements are constructed and configured such that kinetic forces generated by the rotation of said primary impeller arrangement are substantially neutralized by the corresponding counter-rotation of said secondary impeller arrangement.

12. An aspirator assembly as recited in claim 1, wherein the surface geometry of the vane portions of said primary impeller arrangements are a mirror image of the corresponding surface geometry of the vane portions of said secondary impeller arrangement.

13. An aspirator assembly as recited in claim 1, wherein the surface geometry of the outer blade portions of said primary impeller arrangements are a mirror image of the corresponding surface geometry of the outer blade portions of said secondary impeller arrangements.

14. An aspirator assembly as recited in claim 1, wherein said primary and secondary impeller arrangements have substantially identical masses.

15. An aspirator assembly as recited in claim 1, wherein the mass of each of said primary and secondary impeller arrangements is symmetric about its central axis.

16. An aspirator assembly as recited in claim 1, further comprises two pairs of primary and secondary impeller arrangements.

17. An aspirator assembly as recited in claim 16, wherein the central vane portions are disposed between said first and second hub portions and the outer fan blade portions extend outwardly from the outer surface of said outer hub portion.

18. An aspirator assembly as recited in claim 16, wherein said fan members are constructed from a lightweight polymer resin.

19. An aspirator assembly as recited in claim 1, wherein each said impeller arrangement further comprises inner and outer hub portions, the inner hub portion defining a substantially cylindrical channel sized and shaped for being snugly received upon said central shaft.

20. A method for rapidly inflating an inflatable article using an aspirator assembly including a housing having an open upstream end and a downstream end, an inlet for introducing a pressurized fluid, at least two pressurized fluid outlets, and a pair of rotationally mounted impeller arrangements each having an inner vane portion, the method comprising the steps of:

mounting said aspirator assembly directly to said inflatable article such that the upstream open end of said aspirator housing is exposed to ambient air surrounding said inflatable article and said downstream end is disposed within an interior region of said inflatable article; and introducing a pressurized primary fluid from a pressure source into said inlet such that the fluid passes through said fluid outlets and impinges upon the vane portion of a first one of said impeller arrangement in a manner causing rotation of said first impeller arrangement and corresponding counter-rotation of a second one of said impeller arrangements.

* * * * *